(12) United States Patent
Nagai et al.

(10) Patent No.: US 11,482,706 B2
(45) Date of Patent: Oct. 25, 2022

(54) RESIN FOR ENERGY DEVICE ELECTRODE, COMPOSITION FOR FORMING ENERGY DEVICE ELECTRODE, ENERGY DEVICE ELECTRODE, AND ENERGY DEVICE

(71) Applicant: HITACHI CHEMICAL COMPANY, LTD., Tokyo (JP)

(72) Inventors: Shunsuke Nagai, Tokyo (JP); Hiroki Kuzuoka, Tokyo (JP); Kenji Suzuki, Tokyo (JP); Nobuyuki Ogawa, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 337 days.

(21) Appl. No.: 16/488,318

(22) PCT Filed: Feb. 27, 2018

(86) PCT No.: PCT/JP2018/007322
§ 371 (c)(1),
(2) Date: Aug. 23, 2019

(87) PCT Pub. No.: WO2018/155713
PCT Pub. Date: Aug. 30, 2018

(65) Prior Publication Data
US 2019/0379052 A1    Dec. 12, 2019

(30) Foreign Application Priority Data

Feb. 27, 2017 (WO) .................. PCT/JP2017/007557

(51) Int. Cl.
*H01M 4/62*    (2006.01)
*C08F 220/44*    (2006.01)
(Continued)

(52) U.S. Cl.
CPC .......... *H01M 4/622* (2013.01); *C08F 220/26* (2013.01); *C08F 220/286* (2020.02);
(Continued)

(58) Field of Classification Search
CPC .. C08F 220/26; C08F 220/285; C08F 220/44; C08F 220/282
See application file for complete search history.

(56) References Cited

U.S. PATENT DOCUMENTS 7,172,850 B2 *    2/2007    Munnelly ............. B41C 1/1008
                                                                    430/270.1
10,211,460 B2 *    2/2019    Kuwahara ............. H01M 4/622
(Continued)

FOREIGN PATENT DOCUMENTS

CN    101023543 A    8/2007
CN    101847740 A    9/2010
(Continued)

OTHER PUBLICATIONS

Machine translation of JP 2013-09139 (no date).*
(Continued)

*Primary Examiner* — Amanda C. Walke
(74) *Attorney, Agent, or Firm* — Fitch, Even, Tabin & Flannery, LLP (57) ABSTRACT

A resin for an energy device electrode contains a structural unit derived from a nitrile group-containing monomer; and a structural unit derived from a monomer represented by the following Formula (I), wherein the resin does not contain a structural unit that is derived from a carboxy group-containing monomer and that contains a carboxy group, or the resin has a ratio of a structural unit that is derived from a carboxy group-containing monomer and that contains a carboxy group of 0.01 moles or less with respect to 1 mole of the
(Continued)

structural unit derived from a nitrile group-containing monomer, and a ratio of the structural unit derived from a nitrile group-containing monomer to a total of structural units derived from each monomer is from 90% by mole to less than 100%.

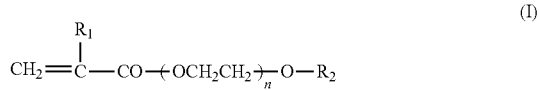

(I)

11 Claims, 1 Drawing Sheet

(51) Int. Cl.
C08F 301/00 (2006.01)
H01M 4/13 (2010.01)
H01M 4/525 (2010.01)
H01M 10/0525 (2010.01)
C08F 220/26 (2006.01)
C08F 220/28 (2006.01)

(52) U.S. Cl.
CPC .......... *C08F 220/44* (2013.01); *C08F 301/00* (2013.01); *H01M 4/13* (2013.01); *H01M 4/525* (2013.01); *H01M 10/0525* (2013.01); *C08F 220/281* (2020.02); *C08F 220/282* (2020.02); *C08F 220/285* (2020.02)

(56) References Cited

U.S. PATENT DOCUMENTS

| | | | | |
|---|---|---|---|---|
| 10,513,604 | B2* | 12/2019 | Nagai | C08L 23/00 |
| 10,944,126 | B2* | 3/2021 | Haba | H01M 4/131 |
| 2008/0003506 | A1* | 1/2008 | Suzuki | C08F 220/44 |
| | | | | 526/318.5 |
| 2019/0097234 | A1* | 3/2019 | Kuzuoka | C08F 20/44 |
| 2019/0379052 | A1* | 12/2019 | Nagai | C08F 301/00 |
| 2020/0235397 | A1* | 7/2020 | Kuzuoka | C08L 35/04 |

FOREIGN PATENT DOCUMENTS

| | | | |
|---|---|---|---|
| CN | 102013515 A | | 4/2011 |
| EP | 3573140 A1 | | 11/2019 |
| JP | 2003-132893 A | | 5/2003 |
| JP | 2004-185826 A | | 7/2004 |
| JP | 2013-004407 A | | 1/2013 |
| JP | 2013098139 A | * | 5/2013 |
| WO | 2006/033173 A1 | | 3/2006 |
| WO | 2014/142281 A1 | | 9/2014 |
| WO | 2016/147857 A1 | | 9/2016 |

OTHER PUBLICATIONS

Machine translation of JP 2004-185826 (no date).*
Zhang et al; "Study of poly(acrylonitrile-methyl methacrylate) as binder for graphite anode and LiMn2O4 Cathode of Li-ion Batteries"; Journal of Power Sources 109 (2002) 422-426.
Li et al. Study of the Failure Mechanisms of LiNi0.8Mn0.1Co0.1O2 Cathode Material for Lithium Ion Batteries, Journal of The Electrochemical Society, 2015,162 (7), p. A1401-A1408 (Cited in ISR).

* cited by examiner

RESIN FOR ENERGY DEVICE ELECTRODE, COMPOSITION FOR FORMING ENERGY DEVICE ELECTRODE, ENERGY DEVICE ELECTRODE, AND ENERGY DEVICE

CROSS-REFERENCE TO RELATED APPLICATIONS

This application is a U.S. national phase application filed under 35 U.S.C. § 371 of International Application No. PCT/JP2018/007322, filed Feb. 27, 2018, designating the United States, which claims priority from International Application No. PCT/JP2017/007557, filed Feb. 27, 2017, designating the United States, the entire contents of each of which are hereby incorporated herein by reference.

TECHNICAL FIELD

The present invention relates to a resin for an energy device electrode, a composition for forming an energy device electrode, an energy device electrode, and an energy device.

BACKGROUND ART

Lithium ion secondary batteries, which are energy devices having high energy density, are widely used as power sources of portable information terminals such as laptop computers, mobile phones, and Personal Digital Assistants (PDAs).

In such a lithium ion secondary battery, a carbon material having a multilayer structure capable of intercalation (formation of lithium intercalation compound) and release of lithium ions is used as an active material of a negative electrode. As an active material of a positive electrode, lithium-containing metal complex oxide is mainly used. An electrode of a lithium ion secondary battery is prepared by applying a slurry prepared by kneading such an active material, a binder resin, a solvent (N-methyl-2-pyrrolidone, water, or the like) and the like on one side or both sides of metal foil that is a current collector with a transfer roll or the like, forming a mixture layer by drying and removing the solvent, and compression molding with a roll press machine or the like.

As a binder resin, polyvinylidene fluoride (hereinafter referred to as PVDF) is widely used. However, since PVDF has poor adhesion to the current collector, when an electrode using PVDF is prepared, in order to ensure adhesion of the interface between a mixture layer and a current collector, a large amount of PVDF should be blended to an active material, which is a factor inhibiting increase in capacity of a lithium ion secondary battery.

As a solution to these problems, Japanese Patent Application Laid-Open No. 2003-132893 discloses a modified poly(meth)acrylonitrile-based binder resin obtained by copolymerizing a monomer such as at least one of 1-olefin having from 2 to 4 carbon atoms and alkyl(meth)acrylate having 3 or less carbon atoms in the alkyl group.

*Journal of Power Sources* 109 (2002) 422-426 also proposes using a binary copolymer of acrylonitrile and methyl methacrylate having a short chain length as a binder resin.

Furthermore, WO2006/033173 discloses a modified poly (meth)acrylonitrile-based binder resin obtained by copolymerizing at least one of ethylene glycol (meth)acrylate and alkyl (meth)acrylate.

SUMMARY OF INVENTION

Technical Problem

In order to increase the electrode density by compression molding, a binder resin is demanded to have excellent rollability. In the disclosure, "rollability" refers to a property in which the electrode density is easily improved by compression molding at the time of forming an electrode. By increasing the electrode density by compression molding, the capacity of a lithium ion secondary battery can be increased.

However, originally, poly(meth)acrylonitrile is a polymer having a rigid molecular structure. Therefore, copolymers described in the above documents are poor in rollability, and it has been difficult in some cases to improve the electrode density by compression molding.

One aspect of the present invention is made in view of the above-described circumstances, and an object thereof is to provide a resin for an energy device electrode and a composition for forming an energy device electrode capable of achieving both adhesion and rollability, and an energy device electrode and an energy device using the resin for an energy device electrode.

Solution to Problem

One aspect of the present invention relates to the following.

<1> A resin for an energy device electrode, the resin comprising:

a structural unit derived from a nitrile group-containing monomer; and a structural unit derived from a monomer represented by the following Formula (I), wherein the resin does not comprise a structural unit that is derived from a carboxy group-containing monomer and that comprises a carboxy group, or the resin has a ratio of a structural unit that is derived from a carboxy group-containing monomer and that comprises a carboxy group of 0.01 moles or less with respect to 1 mole of the structural unit derived from a nitrile group-containing monomer, and a ratio of the structural unit derived from a nitrile group-containing monomer to a total of structural units derived from each monomer is from 90% by mole to less than 100%.

In Formula (I), $R_1$ represents a hydrogen atom or a methyl group, $R_2$ represents a monovalent hydrocarbon group, and n represents an integer from 1 to 50.

<2> The resin for an energy device electrode according to <1>, wherein a ratio of the structural unit derived from a monomer represented by Formula (I) with respect to 1 mole of the structural unit derived from a nitrile group-containing monomer is from 0.001 moles to 0.2 moles.

<3> The resin for an energy device electrode according to <1> or <2>, further comprising a structural unit derived from a monomer represented by the following Formula (II).

In Formula (II), $R_3$ represents a hydrogen atom or a methyl group, and $R_4$ represents an alkyl group having from 4 to 100 carbon atoms.

<4> The resin for an energy device electrode according to <3>, wherein a ratio of the structural unit derived from a monomer represented by Formula (II) with respect to 1 mole of the structural unit derived from a nitrile group-containing monomer is from 0.001 moles to 0.2 moles.

<5> The resin for an energy device electrode according to any one of <1> to <4>, wherein the nitrile group-containing monomer comprises acrylonitrile.

<6> The resin for an energy device electrode according to any one of <1> to <5>, wherein $R_2$ in the monomer represented by Formula (I) is an alkyl group having from 1 to 12 carbon atoms or a phenyl group.

<7> The resin for an energy device electrode according to any one of <1> to <6>, wherein n in the monomer represented by Formula (I) is an integer from 2 to 50.

<8> The resin for an energy device electrode according to any one of <1> to <7>, wherein the monomer represented by Formula (I) comprises methoxytriethylene glycol acrylate.

<9> A composition for forming an energy device electrode, the composition comprising the resin for an energy device electrode according to any one of <1> to <8>.

<10> The composition for forming an energy device electrode according to <9>, further comprising a positive electrode active material comprising a lithium-containing metal composite oxide comprising lithium and nickel and having a ratio of nickel to metal, excluding lithium, of 50% by mole or more.

<11> The composition for forming an energy device electrode according to <10>, wherein the positive electrode active material comprises a compound represented by the following Formula (III).

Formula (III)

In Formula (III), M is at least one selected from the group consisting of Al, Mn, Mg and Ca, a, b, c, d, and e satisfy $0.2 \leq a \leq 1.2$, $0.5 \leq b \leq 0.9$, $0.05 \leq c \leq 0.4$, $0 \leq d \leq 0.2$, and $-0.2 \leq e \leq 0.2$, respectively, and $b+c+d=1$.

<12> An energy device electrode, comprising:
a current collector; and
an electrode mixture layer provided on at least one surface of the current collector and comprising the composition for forming an energy device electrode according to any one of <9> to <11>.

<13> An energy device comprising the energy device electrode according to <12>.

<14> The energy device according to <13>, which is a lithium ion secondary battery.

Advantageous Effects of Invention

According to one aspect of the present invention, a resin for an energy device electrode and a composition for forming an energy device electrode capable of achieving both adhesion and rollability, and an energy device electrode and an energy device using the resin for an energy device electrode are provided.

DESCRIPTION OF EMBODIMENTS

Figure 1:
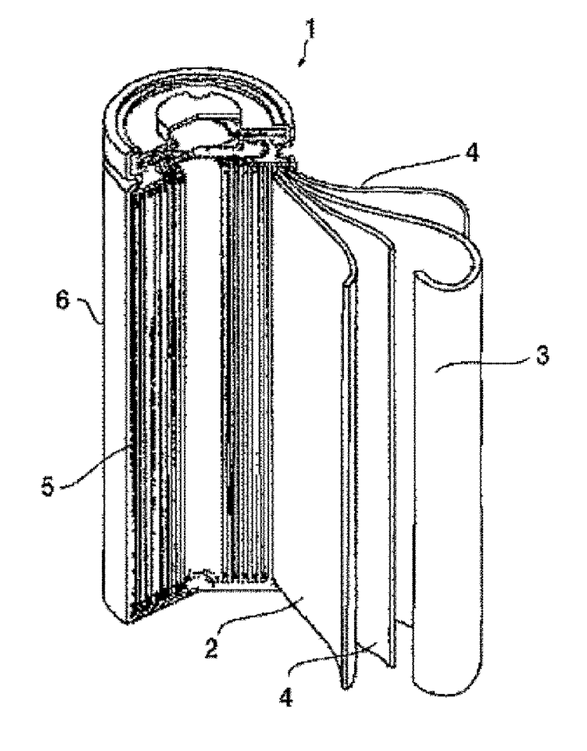
The FIGURE is a sectional view of a lithium ion secondary battery to which the disclosure is applied.

Embodiments of the invention are described below in detail. It is noted here, however, that the invention is not restricted to the below-described embodiments. In the below-described embodiments, the constituents thereof (including element steps and the like) are not indispensable unless otherwise specified. The same applies to the numerical values and ranges thereof, without restricting the invention.

In the present specification, the term "step" encompasses not only steps discrete from other steps but also steps which cannot be clearly distinguished from other steps, as long as the intended purpose of the step is achieved.

In the present specification, those numerical ranges that are expressed with "to" each denote a range that includes the numerical values stated before and after "to" as the minimum value and the maximum value, respectively.

In a set of numerical ranges that are stated stepwisely in the present specification, the upper limit value or the lower limit value of a numerical range may be replaced with the upper limit value or the lower limit value of other numerical range. Further, in a numerical range stated in the present specification, the upper limit or the lower limit of the numerical range may be replaced with a relevant value indicated in any of Examples.

In the present specification, when there are plural kinds of substances that correspond to a component of a composition, the indicated content ratio of the component in the composition means, unless otherwise specified, the total content ratio of the plural kinds of substances existing in the composition.

In the present specification, when there are plural kinds of particles that correspond to a component of a composition, the indicated particle size of the component in the composition means, unless otherwise specified, a value determined for a mixture of the plural kinds of particles existing in the composition.

In the present specification, the term "layer" or "film" includes, when observing a region where a layer or film is present, a case in which the layer or the film is formed only on a part of the region in addition to a case in which the layer or the film is formed on the entirety of the region.

In the present specification, the term "laminate" refers to stacking layers, two or more layers may be combined, and two or more layers may be removable.

In the present specification, "(meth)acrylic" means at least one of acrylic and methacrylic, "(meth)acrylate" means at least one of acrylate and methacrylate, and "(meth)allyl" means at least one of allyl and methallyl.

<Resin for Energy Device Electrode>

The resin for an energy device electrode of the disclosure contains a structural unit derived from a nitrile group-containing monomer and a structural unit derived from a monomer represented by the following Formula (I), wherein the resin does not contain a structural unit that is derived from a carboxy group-containing monomer and that contains a carboxy group, or the resin has a ratio of a structural unit that is derived from a carboxy group-containing monomer and that contains a carboxy group of 0.01 moles or less with respect to 1 mole of the structural unit derived from a nitrile group-containing monomer.

In Formula (I), $R_1$ represents a hydrogen atom or a methyl group, $R_2$ represents a hydrogen atom or a monovalent hydrocarbon group, and n represents an integer from 1 to 50.

The resin for an energy device electrode of the disclosure can achieve both adhesion and rollability. Although not clear, the reason is assumed as follows.

For example, when forming an electrode for a lithium ion secondary battery, a mixture layer containing a resin for an energy device electrode, an active material, and the like formed on a current collector is subjected to compression molding with a roll press machine or the like. In the mixture layer, active materials are considered to be bound by a resin for an energy device electrode. Therefore, it is considered that, during compression molding, active materials bound by a resin for an energy device electrode temporarily separate from each other under pressure, the active materials bind again in a state in which the density of the mixture layer is increased, and the active material is rearranged in the mixture layer in a compressed state, and the density of the mixture layer (or an electrode) is improved.

Here, it is considered that a carboxy group contained in the resin exerts adhesive strength by forming a hydrogen bond with a polar group such as a hydroxyl group contained in an adherend such as an active material. Therefore, it is considered that a resin having a large content of carboxy group exhibits stronger adhesive strength to an adherend.

Although the resin for an energy device electrode of the disclosure has sufficient adhesive strength as a binder resin, since the resin does not contain a structural unit that is derived from a carboxy group-containing monomer and that contains a carboxy group, or the resin has a ratio of a structural unit that is derived from a carboxy group-containing monomer and that contains a carboxy group of 0.01 moles or less with respect to 1 mole of the structural unit derived from a nitrile group-containing monomer, it is considered that its adhesive strength to an adherend is lower than a resin for an energy device electrode having a ratio of a structural unit that is derived from a carboxy group-containing monomer and that contains a carboxy group of more than 0.01 moles with respect to 1 mole of the structural unit derived from a nitrile group-containing monomer. It is thought that active materials are easily separated from each other at the time of compression molding by using a resin for an energy device electrode having a low adhesive strength as a binder resin. Since active materials are easily rearranged due to ease of separation of the active materials, the density of a mixture layer (or an electrode) is likely to be improved, and the rollability is assumed to be improved. Therefore, it is assumed that the resin for an energy device electrode of the disclosure can achieve both adhesion and rollability.

In the disclosure, "binder resin" refers to a resin having a function of binding particles such as an active material.

Components of the resin for an energy device electrode of the disclosure will be described in detail below.

—Nitrile Group-Containing Monomer—

The nitrile group-containing monomer used in the disclosure is not particularly limited. Examples thereof include an acrylic nitrile group-containing monomer such as acrylonitrile or methacrylonitrile, a cyan nitrile group-containing monomer such as α-cyanoacrylate or dicyanovinylidene, and a fumaric-based nitrile group-containing monomer such as fumaronitrile.

Among these, acrylonitrile is preferable in view of easiness of polymerization, cost performance, and pliability, flexibility, and the like of an electrode. The ratio of acrylonitrile to the nitrile group-containing monomer is preferably from 5% by mass to 100% by mass, more preferably from 50% by mass to 100% by mass, and still more preferably from 70% by mass to 100% by mass. These nitrile group-containing monomers may be used singly or in combination of two or more kinds thereof.

When using acrylonitrile and methacrylonitrile in combination as a nitrile group-containing monomer, the content of acrylonitrile is, for example, preferably from 5% by mass to 95% by mass, and more preferably from 50% by mass to 95% by mass, with respect to the total amount of the nitrile group-containing monomer.

—Monomer Represented by Formula (I)—

A monomer represented by Formula (I) used in the disclosure is not particularly limited.

In Formula (I), $R_1$ represents a hydrogen atom or a methyl group, $R_2$ represents a hydrogen atom or a monovalent hydrocarbon group, and n represents an integer from 1 to 50.

In Formula (I), n is an integer from 1 to 50, and is, in one aspect, preferably an integer from 2 to 30, more preferably an integer from 2 to 15, and still more preferably an integer from 2 to 10. In another aspect, n is preferably an integer from 1 to 30, more preferably an integer from 1 to 15, and still more preferably an integer from 1 to 10.

In Formula (I), $R_2$ is a hydrogen atom or a monovalent hydrocarbon group, and is preferably, for example, a monovalent hydrocarbon group, more preferably a monovalent hydrocarbon group having from 1 to 50 carbon atoms, still more preferably a monovalent hydrocarbon group having from 1 to 25 carbon atoms, and particularly preferably a monovalent hydrocarbon group having from 1 to 12 carbon atoms.

When $R_2$ is a hydrogen atom or a monovalent hydrocarbon group having from 1 to 50 carbon atoms, sufficient swelling resistance to an electrolytic solution tends to be obtained. Here, examples of the hydrocarbon group include an alkyl group and a phenyl group. $R_2$ is particularly suitably an alkyl group having from 1 to 12 carbon atoms or a phenyl group. The alkyl group may be linear, branched or cyclic.

In an alkyl group and a phenyl group represented by $R_2$, a part of hydrogen atoms may be substituted by a substituent. Examples of a substituent when $R_2$ is an alkyl group include a halogen atom such as a fluorine atom, a chlorine atom, a bromine atom, or an iodine atom, a substituent containing a nitrogen atom, a substituent containing a phosphorus atom, and an aromatic ring. Examples of a substituent when $R_2$ is a phenyl group include a halogen atom such as a fluorine atom, a chlorine atom, a bromine atom, or an iodine atom, a substituent containing a nitrogen atom, a substituent containing a phosphorus atom, and a cycloalkyl group having from 3 to 10 carbon atoms.

As a monomer represented by Formula (I), a commercially available product or a synthetic product may be used.

Specific examples of a commercially available monomer represented by Formula (I) include 2-methoxyethyl acrylate, ethoxydiethylene glycol acrylate (trade name: LIGHT ACRYLATE EC-A manufactured by KYOEISHA CHEMICAL Co., LTD.), methoxytriethylene glycol acrylate (trade name: LIGHT ACRYLATE MTG-A manufactured by KYOEISHA CHEMICAL Co., LTD., and trade name: NK ESTER AM-30G manufactured by Shin-Nakamura Chemical Co., Ltd.), methoxy poly (n=9) ethylene glycol acrylate (trade name: LIGHT ACRYLATE 130-A manufactured by KYOEISHA CHEMICAL Co., LTD., and trade name: NK ESTER AM-90G manufactured by Shin-Nakamura Chemical Co., Ltd.), methoxy poly (n=13) ethylene glycol acrylate (trade name: NK ESTER AM-130G manufactured by Shin-Nakamura Chemical Co., Ltd.), methoxy poly (n=23) ethylene glycol acrylate (trade name: NK ESTER AM-230G manufactured by Shin-Nakamura Chemical Co., Ltd.), octoxy poly (n=18) ethylene glycol acrylate (trade name: NK ESTER A-OC-18E manufactured by Shin-Nakamura Chemical Co., Ltd.), phenoxy diethylene glycol acrylate (trade name: LIGHT ACRYLATE P-200A manufactured by KYOEISHA CHEMICAL Co., LTD., and trade name: NK ESTER AMP-20GY manufactured by Shin-Nakamura Chemical Co., Ltd.), phenoxy poly (n=6) ethylene glycol acrylate (trade name: NK ESTER AMP-60G manufactured by Shin-Nakamura Chemical Co., Ltd.), nonyl phenol EO adduct (n=4) acrylate (trade name: LIGHT ACRYLATE NP-4EA manufactured by KYOEISHA CHEMICAL Co., LTD.), nonyl phenol EO adduct (n=8) acrylate (trade name: LIGHT ACRYLATE NP-8EA manufactured by KYOEISHA CHEMICAL Co., LTD.), methoxy diethylene glycol methacrylate (trade name: LIGHT ESTER MC manufactured by KYOEISHA CHEMICAL Co., LTD., and trade name: NK ESTER M-20G manufactured by Shin-Nakamura Chemical Co., Ltd.), methoxy triethylene glycol methacrylate (trade name: LIGHT ESTER MTG manufactured by KYOEISHA CHEMICAL Co., LTD.), methoxy poly (n=9) ethylene glycol methacrylate (trade name: LIGHT ESTER 130MA manufactured by KYOEISHA CHEMICAL Co., LTD., and trade name: NK ESTER M-90G manufactured by Shin-Nakamura Chemical Co., Ltd.), methoxy poly (n=23) ethylene glycol methacrylate (trade name: NK ESTER M-230G manufactured by Shin-Nakamura Chemical Co., Ltd.) and methoxy poly (n=30) ethylene glycol methacrylate (trade name: LIGHT ESTER 041MA manufactured by KYOEISHA CHEMICAL Co., LTD.).

Among these, a methoxytriethylene glycol acrylate (a compound in which, in Formula (I), $R_1$ is a hydrogen atom, $R_2$ is a methyl group, and n is 3) is more preferable from the viewpoint of reactivity when copolymerizing with a nitrile group-containing monomer. Monomers represented by Formula (I) may be used singly or in combination of two or more kinds thereof —Carboxy Group-Containing Monomer—

The carboxy group-containing monomer is not particularly limited, and specific examples thereof include an acrylic carboxy group-containing monomer such as acrylic acid or methacrylic acid, a crotonic carboxy group-containing monomer such as crotonic acid, a maleic carboxy group-containing monomer such as maleic acid or an anhydride thereof, an itaconic carboxy group-containing monomer such as itaconic acid or an anhydride thereof, and a citraconic carboxy group-containing monomer such as citraconic acid or an anhydride thereof.

—Monomer Represented by Formula (II)—

In the disclosure, a monomer represented by Formula (II) may be used if necessary. The monomer represented by Formula (II) used in the disclosure is not particularly limited.

(II)

In Formula (II), $R_3$ represents a hydrogen atom or a methyl group, and $R_4$ represents an alkyl group having from 4 to 100 carbon atoms.

In Formula (II), $R_4$ is an alkyl group having from 4 to 100 carbon atoms, preferably an alkyl group having from 4 to 50 carbon atoms, more preferably an alkyl group having from 6 to 30 carbon atoms, and still more preferably an alkyl group having from 8 to 15 carbon atoms.

When $R_4$ is an alkyl group having 4 or more carbon atoms, sufficient flexibility tends to be obtained. When $R_4$ is an alkyl group having 100 or less carbon atoms, sufficient swelling resistance to an electrolytic solution tends to be obtained.

The alkyl group represented by $R_4$ may be linear, branched, or cyclic.

In the alkyl group represented by $R_4$, a part of hydrogen atoms may be substituted by a substituent. Examples of the substituent include a halogen atom such as a fluorine atom, a chlorine atom, a bromine atom, or an iodine atom, a substituent containing a nitrogen atom, a substituent containing a phosphorus atom, and an aromatic ring. Examples of the alkyl group represented by $R_4$ include, in addition to a linear, branched, or cyclic saturated alkyl group, a halogenated alkyl group such as a fluoroalkyl group, a chloroalkyl group, a bromoalkyl group, or an iodide alkyl group.

As the monomer represented by Formula (II), a commercially available product or a synthetic product may be used. Specific examples of the monomer represented by Formula (II) which can be obtained as a commercially available product include an ester of (meth)acrylic acid containing an alkyl group having from 4 to 100 carbon atoms such as n-butyl (meth)acrylate, isobutyl (meth)acrylate, t-butyl (meth)acrylate, amyl (meth)acrylate, isoamyl (meth)acrylate, hexyl (meth)acrylate, heptyl (meth)acrylate, octyl (meth)acrylate, 2-ethyl hexyl (meth)acrylate, nonyl (meth)acrylate, decyl (meth)acrylate, isodecyl (meth)acrylate, lauryl (meth)acrylate, tridecyl (meth)acrylate, hexadecyl (meth)acrylate, stearyl (meth)acrylate, isostearyl (meth)acrylate, cyclohexyl (meth)acrylate, or isobornyl (meth)acrylate.

When $R_4$ is a fluoroalkyl group, examples the monomer include an acrylate compound such as 1,1-bis(trifluoromethyl)-2,2,2-trifluoroethyl acrylate, 2,2,3,3,4,4,4-heptafluorobutyl acrylate, 2,2,3,4,4,4-hexafluorobutyl acrylate, nonafluoroisobutyl acrylate, 2,2,3,3,4,4,5,5-octafluoropentyl acrylate, 2,2,3,3,4,4,5,5,5-nonafluoropentyl acrylate, 2,2,3,3,4,4,5,5,6,6,6-undecafluorohexyl acrylate, 2,2,3,3,4,4,5,5,6,6,7,7,8,8,8-pentadecafluorooctyl acrylate, 3,3,4,4,5,5,6,6,7,7,8,8,9,9,10,10,10-heptadecafluorodecyl acrylate, or 2,2,3,3,4,4,5,5,6,6,7,7,8,8,9,9,10,10-nonadecafluorodecyl acrylate, and a methacrylate compound such as nonafluoro-t-butyl methacrylate, 2,2,3,3,4,4,4-heptafluorobutyl methacrylate, 2,2,3,3,4,4,5,5-octafluoropentyl methacrylate, 2,2,3,3,4,4,5,5,6,6,7,7-dodecafluoroheptyl methacrylate, heptadecafluorooctyl methacrylate, 2,2,3,3,4,4,5,5,6,6,7,7,8, 8,8-pentadecafluorooctyl methacrylate, or 2,2,3,3,4,4,5,5,6, 6,7,7,8,8,9,9-hexadecafluorononyl methacrylate.

Monomers represented by Formula (II) may be used singly or in combination of two or more kinds thereof —Other Monomers—

As long as the resin for an energy device electrode of the disclosure contains a structural unit derived from a nitrile group-containing monomer and a structural unit derived from a monomer represented by the Formula (I), and does not contain a structural unit that is derived from a carboxy group-containing monomer and that contains a carboxy group, or has a ratio of a structural unit that is derived from a carboxy group-containing monomer and that contains a carboxy group of 0.01 moles or less with respect to 1 mole of the structural unit derived from a nitrile group-containing monomer, structural units derived from other monomers different from such monomers can also be combined as appropriate.

Other monomers are not particularly limited, and examples thereof include a (meth)acrylic ester containing an alkyl group having from 1 to 3 carbon atoms such as methyl (meth)acrylate, ethyl (meth)acrylate, or propyl (meth)acrylate, a vinyl halide such as vinyl chloride, vinyl bromide, or vinylidene chloride, maleic imide, phenyl maleimide, (meth) acrylamide, styrene, α-methylstyrene, vinyl acetate, sodium (meth)allyl sulfonate, sodium (meth)allyloxybenzene sulfonate, sodium styrene sulfonate, and 2-acrylamido-2-methylpropane sulfonic acid, and a salt thereof. These other monomers may be used singly or in combination of two or more kinds thereof —Ratio of Structural Unit Derived from Each Monomer—

The ratio of a structural unit derived from each of the above monomers contained in the resin for an energy device electrode of the disclosure except for a structural unit derived from a carboxy group-containing monomer and containing a carboxy group is not particularly limited.

The ratio of a structural unit derived from a nitrile group-containing monomer to a total of structural units derived from the above-mentioned each monomer contained in the resin for an energy device electrode of the disclosure is preferably from 50% by mole to less than 100% by mole, more preferably from 80% by mole to less than 100% by mole, and still more preferably from 90% by mole to less than 100% by mole.

When the ratio of a structural unit derived from a nitrile group-containing monomer to the total of structural units derived from each monomer is from 90% by mole to less than 100% by mole, n in a monomer represented by Formula (I) may be an integer from 2 to 50.

The ratio of a structural unit derived from a carboxy group-containing monomer and containing a carboxy group to 1 mole of a structural unit derived from a nitrile group-containing monomer is preferably 0.005 moles or less, and more preferably 0.001 moles or less.

The ratio of a structural unit derived from a monomer represented by Formula (I) to 1 mole of a structural unit derived from a nitrile group-containing monomer is, for example, preferably from 0.001 moles to 0.2 moles, more preferably from 0.003 moles to 0.05 moles, and still more preferably from 0.005 moles to 0.035 moles. When the ratio of a structural unit derived from a monomer represented by Formula (I) to 1 mole of a structural unit derived from a nitrile group-containing monomer is from 0.001 moles to 0.2 moles, the pliability and flexibility of an electrode tend to be more favorable without impairing the adhesion to a current collector, particularly to a positive electrode current collector using an aluminum foil, and the swelling resistance to an electrolytic solution.

When the resin for an energy device electrode of the disclosure includes a structural unit derived from a monomer represented by Formula (II), the ratio of the structural unit derived from a monomer represented by Formula (II) to 1 mole of a structural unit derived from a nitrile group-containing monomer is, for example, preferably from 0.001 moles to 0.2 moles, more preferably from 0.003 moles to 0.05 moles, and still more preferably from 0.005 moles to 0.02 moles. When the ratio of the structural unit derived from a monomer represented by Formula (II) is from 0.001 moles to 0.2 moles, the pliability and flexibility of an electrode tend to be more favorable without impairing the adhesion to a current collector, particularly to a positive electrode current collector using an aluminum foil, and the swelling resistance to an electrolytic solution.

When the resin for an energy device electrode of the disclosure includes a structural unit derived from a monomer represented by Formula (II), the ratio of the sum of a structural unit derived from a monomer represented by Formula (I) and a structural unit derived from a monomer represented by Formula (II) to 1 mole of a structural unit derived from a nitrile group-containing monomer is, for example, preferably from 0.001 moles to 0.2 moles, more preferably from 0.003 moles to 0.05 moles, and still more preferably from 0.005 moles to 0.035 moles.

When the resin for an energy device electrode of the disclosure contains a structural unit derived from other monomers, the ratio of a structural unit derived from other monomers to 1 mole of a structural unit derived from a nitrile group-containing monomer is, for example, preferably from 0.005 moles to 0.1 moles, more preferably from 0.01 moles to 0.06 moles, and still more preferably from 0.03 moles to 0.05 moles.

—Method of Manufacturing Resin for Energy Device Electrode—

The method of manufacturing the resin for an energy device electrode of the disclosure is not particularly limited. A polymerization method such as precipitation polymerization in water, bulk polymerization, suspension polymerization, emulsion polymerization, or solution polymerization may be applied. Precipitation polymerization in water is preferred in view of easiness of resin synthesis, easiness of post treatment such as recovery or purification.

Hereinafter, precipitation polymerization in water will be described in detail.

—Polymerization Initiator—

As a polymerization initiator at the time of performing precipitation polymerization in water, it is preferable to use a water-soluble polymerization initiator in view of the polymerization initiation efficiency and the like.

Examples of the water-soluble polymerization initiator include a persulfate such as ammonium persulfate, potassium persulfate, or sodium persulfate, a water-soluble peroxide such as hydrogen peroxide, a water-soluble azo compound such as 2,2'-azobis(2-methylpropionamidine hydrochloride), and oxidation-reduction type (redox type) initiator combining an oxidant such as persulfate, a reducing agent such as sodium bisulfite, ammonium bisulfite, sodium thiosulfate, or hydrosulfite, and a polymerization accelerator such as sulfuric acid, iron sulfate, or copper sulfate.

Among these, a persulfate, a water-soluble azo compound, and the like are preferable in terms of easiness of resin synthesis and the like. Among persulfates, ammonium persulfate is particularly preferred.

When acrylonitrile is selected as the nitrite group-containing monomer, and methoxytriethylene glycol acrylate is selected as the monomer represented by Formula (I) to carry out precipitation polymerization in water, both are water-soluble in their monomer states, and therefore, a water-soluble polymerization initiator acts effectively, and polymerization starts smoothly. As the polymerization proceeds, a polymer precipitates, and therefore, a reaction system is in a suspended state, and eventually, a resin for an energy device electrode with a small amount of unreacted product can be obtained in a high yield.

A polymerization initiator is preferably used, with respect to the total amount of monomers used in the synthesis of the resin for energy device electrodes, for example, in the range of from 0.001% by mole to 5% by mole, and more preferably in the range of from 0.01% by mole to 2% by mole.

—Chain Transfer Agent—

When precipitation polymerization in water is carried out, a chain transfer agent can be used for the purpose of molecular weight control and the like. Examples of the chain transfer agent include a mercaptan compound such as thioglycol, carbon tetrachloride, and α-methylstyrene dimer. Among these, α-methylstyrene dimer or the like is preferable in terms of low odor or the like.

—Solvent—

When precipitation polymerization in water is carried out, a solvent other than water may be added if necessary for adjusting the particle diameter of a resin to be precipitated.

Examples of the solvent other than water include an amide such as N-methyl-2-pyrrolidone, N,N-dimethylacetamide, or N,N-dimethylformamide, a urea such as N,N-dimethylethyleneurea, N,N-dimethylpropyleneurea, or tetramethylurea, a lactone such as γ-butyrolactone or γ-caprolactone, a carbonate such as propylene carbonate, a ketone such as acetone, methyl ethyl ketone, methyl isobutyl ketone, or cyclohexanone, an ester such as methyl acetate, ethyl acetate, n-butyl acetate, butyl cellosolve acetate, butyl carbitol acetate, ethyl cellosolve acetate, or ethyl carbitol acetate, a glyme such as diglyme, triglyme, or tetraglyme, a hydrocarbon such as toluene, xylene, or cyclohexane, a sulfoxide such as dimethyl sulfoxide, a sulfone such as sulfolane, and an alcohol such as methanol, isopropanol, or n-butanol. These solvents may be used singly, or in combination of two or more kinds thereof —Polymerization Conditions—

Precipitation polymerization in water is carried out, for example, by introducing a monomer into a solvent and maintaining the polymerization temperature at preferably from 0° C. to 100° C., and more preferably from 30° C. to 90° C. for preferably from 1 hour to 50 hours, and more preferably from 2 hours to 12 hours.

In cases in which the polymerization temperature is 0° C. or higher, the polymerization reaction tends to be promoted. In cases in which the polymerization temperature is 100° C. or less, even when water is used as a solvent, failure to polymerize due to water evaporation tends to be unlikely.

In particular, since the heat of polymerization of a nitrile group-containing monomer tends to be large, it is preferable to proceed the polymerization while dropping the nitrile group-containing monomer into the solvent.

The weight average molecular weight of the resin for an energy device electrode of the disclosure is preferably from 10,000 to 1,000,000, more preferably from 100,000 to 800,000, and still more preferably from 250,000 to 700,000.

In the disclosure, the weight average molecular weight refers to a value measured by the following method.

A measurement target is dissolved in N-methyl-2-pyrrolidone, and insolubles are removed through PTFE (polytetrafluoroethylene) filter [manufactured by KURABO INDUSTRIES LTD., for HPLC (high-performance liquid chromatography) pretreatment, chromatodisc, model number: 13 N, pore diameter: 0.45 μm]. The weight average molecular weight is measured using GPC [a pump: L6200 PUMP (manufactured by Hitachi, Ltd.), a detector: DIFFERENTIAL REFRACTIVE INDEX DETECTOR L3300 RI MONITOR (manufactured by Hitachi, Ltd.), columns: TSKGEL-G5000HXL and TSKGEL-G2000HXL (2 in total) (both manufactured by Tosoh Corporation) connected in series, column temperature: 30° C., eluent: N-methyl-2-pyrrolidone, flow rate: 1.0 mL/min, standard substance: polystyrene].

The acid value of the resin for an energy device electrode of the disclosure is preferably from 0 mg KOH/g to 70 mg KOH/g, more preferably from 0 mg KOH/g to 20 mg KOH/g, and still more preferably from 0 mg KOH/g to 5 mg KOH/g.

In the disclosure, the acid value refers to a value measured by the following method.

First, after accurately weighing 1 g of a measurement target, 30 g of acetone is added to the measurement target, and the measurement target is dissolved. Next, an appropriate amount of phenolphthalein which is an indicator is added to a solution of the measurement target, and titration is performed using a 0.1 N aqueous solution of KOH. From the titration result, the acid value is calculated by Formula (A) (in Formula (A), Vf indicates the titration amount (mL) of phenolphthalein, Wp indicates the mass (g) of the solution of the measurement target, and I indicates the proportion (% by mass) of a non-volatile content of the solution of the measurement target).

$$\text{acid value (mgKOH/g)} = 10 \times Vf \times 56.1/(Wp \times I) \qquad (A)$$

The non-volatile content of the solution of the measurement target is calculated from the weight of a residue obtained by taking about 1 mL of the solution of the measurement target in an aluminum pan and drying on a hot plate heated to 160° C. for 15 minutes.

—Application of Resin for Energy Device Electrode—

The resin for an energy device electrode of the disclosure is suitably utilized for energy devices, particularly non-aqueous electrolyte energy devices. The non-aqueous electrolyte energy device refers to a storage or power generation device (apparatus) using an electrolytic solution other than water.

Examples of the energy device include a lithium ion secondary battery, an electric double layer capacitor, a solar cell, and a fuel cell. The resin for an energy device electrode of the disclosure has high swelling resistance with a non-aqueous electrolyte such as an organic solvent other than water, and is preferably used for electrodes of lithium ion secondary batteries.

The resin for an energy device electrode of the disclosure can be widely utilized not only for energy devices but also for coatings, adhesives, curing agents, printing inks, solder resists, abrasives, sealants for electronic parts, surface protective films and interlayer insulating films of semiconductors, varnishes for electrical insulation, various coating resins such as biomaterials, molding materials, or fibers.

<Composition for Forming Energy Device Electrode>

The composition for forming an energy device electrode of the disclosure includes the resin for an energy device electrode of the disclosure.

The composition for forming an energy device electrode of the disclosure should just contain the resin for an energy device electrode of the disclosure, and may contain various other components if necessary.

—Solvent—

When the composition for forming an energy device electrode of the disclosure is used as a varnish, it is preferable that the composition for forming an energy device electrode of the disclosure contains a solvent.

A solvent used to prepare a varnish-like composition for forming an energy device electrode is not particularly limited, and, for example, a solvent that can be added when performing the above-described precipitation polymerization in water, water, or the like can be used. Among these, in terms of the solubility of the resin for an energy device electrode, and the like, an amide solvent, a urea solvent, a lactone solvent, or the like, or a mixed solvent containing them is preferable, and N-methyl-2-pyrrolidone, γ-butyrolactone or a mixed solvent containing them is more preferable. These solvents may be used singly, or in combination of two or more kinds thereof.

The content of the solvent is not particularly limited as long as the content is an amount that is at least the minimum necessary amount that allows the resin for an energy device electrode to be in a dissolved state at normal temperature (for example, 25° C.). In a slurry preparation step in production of an energy device electrode, in general, viscosity adjustment is performed while adding a solvent, and therefore, the amount is preferably an arbitrary amount that does not result in excessive dilution.

When the composition for forming an energy device electrode of the disclosure contains a solvent, the viscosity at 25° C. is preferably from 500 mPa·s to 50,000 mPa·s, more preferably from 1,000 mPa·s to 20,000 mPa·s, and still more preferably from 2,000 mPa·s to 10,000 mPa·s.

The viscosity is measured using a rotary shear viscometer at 25° C. and a shear rate of $1.0 \ s^{-1}$.

—Active Material—

The composition for forming an energy device electrode of the disclosure may contain an active material. The active material used in the disclosure is not particularly limited as long as the material can reversibly insert and release lithium ions by, for example, charge and discharge of a lithium ion secondary battery which is an energy device. The positive electrode has a function of releasing lithium ions at the time of charging and receiving lithium ions at the time of discharging, while the negative electrode has a function opposite to that of the positive electrode of receiving lithium ions at the time of charging and releasing lithium ions at the time of discharging. Therefore, as the active materials used in the positive electrode and the negative electrode, different materials are generally used in accordance with their respective functions.

A material capable of absorbing and releasing lithium ions, which is commonly used in the field of lithium ion secondary batteries can be used as an active material (negative electrode active material) used for a negative electrode of a lithium ion secondary battery. Examples of the negative electrode active material include metal lithium, a lithium alloy, an intermetallic compound, a carbon material, a metal complex, and an organic polymer compound. Negative electrode active materials may be used singly, or in combination of two or more kinds thereof. Among these, a carbon material is preferable. Examples of the carbon material include graphite such as natural graphite (scaly graphite or the like) or artificial graphite, carbon black such as acetylene black, ketjen black, channel black, furnace black, lamp black, or thermal black, and carbon fiber. The average particle diameter of the carbon material is preferably from 0.1 μm to 60 μm, and more preferably from 0.5 μm to 30 μm. The BET specific surface area of the carbon material is preferably from 1 m²/g to 10 m²/g.

From the viewpoint of further improving the battery characteristics, among the carbon materials, graphite having a carbon hexagonal plane spacing ($d_{002}$) of from 3.35 Å to 3.40 Å and a crystallite (Lc) in the c-axis direction of 100 Å or more in X-ray wide-angle diffraction method is particularly preferable.

From the viewpoint of further improving the cycle characteristics and safety, among the carbon materials, amorphous carbon in which the spacing ($d_{002}$) of carbon hexagonal planes in the X-ray wide-angle diffraction method is from 3.50 Å to 3.95 Å is particularly preferable.

In the specification, the average particle diameter is a value (median diameter (D50)) when a sample is dispersed in purified water containing a surfactant and the integration from the small diameter side is 50% in the volume-based particle size distribution measured by a laser diffraction particle size distribution analyzer (for example, SALD-3000J manufactured by Shimadzu Corporation).

The BET specific surface area can be measured, for example, from the nitrogen adsorption capacity according to JIS Z 8830: 2013. As an evaluation device, for example, AUTOSORB-1 (trade name) manufactured by QUANTACHROME corporation can be used. Since water adsorbed in the sample surface and structure is considered to affect the gas adsorption capacity, it is preferable to first carry out a pretreatment of water removal by heating when measuring the BET specific surface area.

In the pretreatment, a measurement cell loaded with 0.05 g of a measurement sample is depressurized to 10 Pa or less by a vacuum pump and then heated at 110° C. and held for 3 hours or more, and then naturally cooled to normal temperature (25° C.) while maintaining the depressurized state. After this pretreatment, measurement is carried out at an evaluation temperature of 77 K and the evaluation pressure range is less than 1 at relative pressure (equilibrium pressure with respect to saturated vapor pressure).

On the other hand, as the active material (positive electrode active material) used for a positive electrode of a lithium ion secondary battery, those commonly used in this field can be used, and examples thereof include a lithium-containing metal complex oxide, an olivine-type lithium salt, a chalcogen compound, and manganese dioxide. The lithium-containing metal composite oxide is a metal oxide containing lithium and a transition metal, or a metal oxide in which part of the transition metal in the metal oxide is substituted by a different element. Here, examples of the different element include Na, Mg, Sc, Y, Mn, Fe, Co, Ni, Cu, Zn, Al, Cr, Pb, Sb, V, and B, and Mn, Al, Co, Ni, Mg, or the like is preferable. The different elements may be used singly, or in combination of two or more kinds thereof.

Examples of the lithium-containing metal complex oxide include $Li_xCoO_2$, $Li_xNiO_2$, $Li_xMnO_2$, $Li_xCo_yNi_{1-y}O_2$, $Li_xCo_yM^1_{1-y}O_z$ (in $Li_xCo_yM^1_{1-y}O_z$, $M^1$ represents at least one element selected from the group consisting of Na, Mg, Sc, Y, Mn, Fe, Cu, Zn, Al, Cr, Pb, Sb, V, and B), $Li_xNi_{1-y}M^2_yO_z$ (in $Li_xNi_{1-y}M^2_yO_z$, $M^2$ represents at least one element selected from the group consisting of Na, Mg, Sc, Y, Mn, Fe, Co, Cu, Zn, Al, Cr, Pb, Sb, V, and B), $Li_xMn_2O_4$, and $Li_xMn_{2-y}M^3_yO_4$ (in $Li_xMn_{2-y}M^3_yO_4$, $M^3$ represents at least one element selected from the group consisting of Na, Mg, Sc, Y, Fe, Co, Ni, Cu, Zn, Al, Cr, Pb, Sb, V, and B). Here, x is in the range of 0<x≤1.2, y is in the range of from 0 to

0.9, and z is in the range of from 2.0 to 2.3. The x value indicating the molar ratio of lithium increases or decreases due to charging and discharging.

Examples of the olivine-type lithium salt include LiFePO$_4$. Examples of the chalcogen compound include titanium disulfide and molybdenum disulfide. Examples of the other positive electrode active material include Li$_2$MPO$_4$F (in Li$_2$MPO$_4$F, M represents at least one element selected from the group consisting of Na, Mg, Sc, Y, Mn, Fe, Co, Ni, Cu, Zn, Al, Cr, Pb, Sb, V, and B). The positive electrode active material may be used singly, or in combination of two or more kinds thereof.

As the positive electrode active material, it is preferable to use a positive electrode active material containing a lithium-containing metal composite oxide containing lithium and nickel and having a ratio of nickel to metal, excluding lithium, of 50% by mole or more.

When a resin composition is prepared by applying PVDF generally used as a binder resin to a positive electrode active material in which the ratio of nickel to metal, excluding lithium, is 50% by mole or more, the resin composition may gel. On the other hand, when the resin for an energy device electrode of the disclosure is used as a binder resin, the occurrence of gelation of the resin composition tends to be suppressed.

In particular, in order to increase the charge and discharge capacity per unit mass in the above-described positive electrode active material, and to obtain a high capacity positive electrode for an energy device, it is preferable to use the positive electrode active material represented by the following Formula (III) as a positive electrode active material.

Li$_a$Ni$_b$Co$_c$M$_d$O$_{2+e}$      Formula (III)

In Formula (III), M is at least one selected from the group consisting of Al, Mn, Mg, and Ca, a, b, c, d, and e satisfy $0.2 \leq a \leq 1.2$, $0.5 \leq b \leq 0.9$, $0.05 \leq c \leq 0.4$, $0 \leq d \leq 0.2$, and $-0.2 \leq e \leq 0.2$, respectively, and b+c+d=1.

As the ratio of Ni increases, the capacity density of a positive electrode active material tends to increase, and as the ratio of Ni decreases, the thermodynamic stability of a positive electrode active material tends to increase, and therefore, the ratio of Ni is preferably $0.5 \leq b \leq 0.9$, more preferably $0.55 \leq b \leq 0.85$, and still more preferably $0.6 \leq b \leq 0.8$. The discharge performance of a positive electrode active material tends to improve as the ratio of Co increases, and the capacity density of a positive electrode active material tends to increase as the ratio of Co decreases, and therefore, it is preferable that $0.05 \leq c \leq 0.4$, and more preferably $0.1 \leq c \leq 0.4$.

Further, M in Formula (III) can contain at least one selected from the group consisting of Al, Mn, Mg, and Ca. When such an element is contained, the thermodynamic stability of a positive electrode active material tends to increase, and further, an increase in resistance caused by nickel entering a lithium site tends to be suppressed. On the other hand, the smaller the ratio of M, the larger the capacity density of a positive electrode active material. From such a viewpoint, it is preferable that the ratio of M is $0 \leq d \leq 0.2$.

The positive electrode active material represented by Formula (III) can be prepared by a method commonly used in the art. An example of such preparation is shown below.

First, a metal salt solution of a metal to be introduced into a positive electrode active material is prepared. As a metal salt, one commonly used in the field of energy devices can be used, and examples thereof include a sulfate, a chloride, a nitrate, and an acetate.

Among these, a nitrate is preferable because it functions as an oxidizing agent in a subsequent baking process to facilitate oxidation of a metal in a raw material for baking and also to evaporate in the baking, and thus hardly remain in the positive electrode active material. The molar ratio of each metal contained in a metal salt solution is preferably equal to the molar ratio of each metal of the positive electrode active material to be prepared.

Next, a lithium source is suspended in pure water. As the lithium source, those commonly used in the field of energy devices can be used, and examples thereof include lithium carbonate, lithium nitrate, lithium hydroxide, lithium acetate, alkyllithium, fatty acid lithium, and halogen lithium. A metal salt solution of the metal is then added, and a lithium salt solution slurry is prepared. At this time, fine particles of lithium-containing carbonate precipitate in the slurry. The average particle diameter of the lithium-containing carbonate in the slurry can be adjusted by the shear rate of the slurry. A precursor of a positive electrode active material is obtained by separating the precipitated lithium-containing carbonate by filtration and then drying.

The obtained lithium-containing carbonate is filled in a baking container and baked in a calcining furnace. Baking is preferably maintained in a heated state under an atmosphere containing oxygen, preferably under an oxygen atmosphere for a predetermined time. Furthermore, the baking is preferably performed under pressure at from 101 kPa to 202 kPa. The amount of oxygen in a composition can be increased by heating under pressure. The baking temperature is preferably from 850° C. to 1,200° C., more preferably from 850° C. to 1,100° C., and still more preferably from 850° C. to 1,000° C. When baking is performed in such a temperature range, the crystallinity of a positive electrode active material tends to be improved.

The average particle diameter of a positive electrode active material is preferably from 0.1 μm to 60 μm, and more preferably from 0.5 μm to 30 μm. The BET specific surface area of a positive electrode active material is preferably from 1 m$^2$/g to 10 m$^2$/g.

—Conductive Agent—

A conductive agent may be used in combination with an active material.

As the conductive agent, carbon black, graphite, carbon fiber, metal fiber, or the like can be used. Examples of the carbon black include acetylene black, ketjen black, channel black, furnace black, lamp black, and thermal black. Examples of the graphite include natural graphite, and artificial graphite. The conductive agents may be used singly, or in combination of two or more kinds thereof.

—Other Additives—

If necessary, various additives such as a crosslinking component for complementing swelling resistance to electrolyte, a rubber component for complementing electrode pliability and flexibility, an anti-precipitation agent for improving electrode coatability of slurry, an antifoaming agent, and a leveling agent can be blended as other materials into the composition for forming an energy device electrode of the disclosure.

<Energy Device Electrode>

The energy device electrode of the disclosure includes a current collector, and an electrode mixture layer provided on at least one surface of the current collector and including the composition for forming an energy device electrode of the disclosure.

The energy device electrode of the disclosure can be used as an electrode for a lithium ion secondary battery, an electric double layer capacitor, a solar cell, a fuel cell, or the like.

Hereinafter, although a case in which the energy device electrode of the disclosure is applied to an electrode of a lithium ion secondary battery will be described in detail, the energy device electrode of the disclosure is not limited to the following contents.

—Current Collector—

The current collector used in the present disclosure is not particularly limited, and one commonly used in the field of lithium ion secondary batteries can be used.

Examples of the current collector (positive electrode current collector) used for a positive electrode of a lithium ion secondary battery include a sheet and a foil containing stainless steel, aluminum, titanium, or the like.

Among these, a sheet or foil containing aluminum is preferable. The thickness of the sheet and the foil is not particularly limited, and from the viewpoint of securing the strength and processability needed for a current collector, is preferably, for example, from 1 µm to 500 µm, more preferably from 2 µm to 80 µm, still more preferably from 5 µm to 50 µm.

Examples of the current collector (negative electrode current collector) used for a negative electrode of a lithium ion secondary battery include a sheet, a foil, or the like containing stainless steel, nickel, copper, or the like.

Among these, a sheet or a foil containing copper is preferable. The thickness of the sheet and the foil is not particularly limited, and from the viewpoint of securing the strength and processability needed for a current collector, is preferably, for example, from 1 µm to 500 µm, more preferably from 2 µm to 100 µm, and still more preferably from 5 µm to 50 µm.

—Electrode Mixture Layer—

An electrode mixture layer used for a lithium ion secondary battery can be formed using a composition for forming an energy device electrode including an active material, a solvent, and the like.

The positive electrode mixture layer is formed by using a composition for forming an energy device electrode including a positive electrode active material. On the other hand, a negative electrode mixture layer is formed by using a composition for forming an energy device electrode containing a negative electrode active material.

The electrode mixture layer can be formed, for example, by preparing a slurry of a composition for forming an energy device electrode, applying the slurry on at least one surface of a current collector, then drying and removing a solvent, and rolling if necessary.

Application of a slurry can be performed using, for example, a comma coater or the like. Application is suitably performed in such a manner that the ratio of the positive electrode capacity and the negative electrode capacity (negative electrode capacity/positive electrode capacity) of the opposed electrodes is 1 or more.

The application amount of a slurry is, for example, preferably from 5 g/m$^2$ to 500 g/m$^2$, and more preferably from 50 g/m$^2$ to 300 g/m$^2$, of the dry mass per one side of an electrode mixture layer.

Removal of a solvent is carried out, for example, by drying at from 50° C. to 150° C., preferably from 80° C. to 120° C., for from 1 minute to 20 minutes, preferably from 3 minutes to 10 minutes.

The rolling is performed using, for example, a roll press, and pressing is performed such that the density of a mixture layer is for example from 1 g/cm$^3$ to 2 g/cm$^3$, preferably from 1.2 g/cm$^3$ to 1.8 g/cm$^3$, in the case of a mixture layer of a negative electrode, and for example from 2 g/cm$^3$ to 5 g/cm$^3$, preferably from 2 g/cm$^3$ to 4 g/cm$^3$, in the case of a mixture layer of a positive electrode.

Furthermore, for example, vacuum drying may be performed at from 100° C. to 150° C. for from 1 hour to 20 hours for removal or the like of a residual solvent or adsorbed water in an electrode.

<Energy Device>

An energy device of the disclosure includes the energy device electrode of the disclosure. Examples of the energy device of the disclosure include a lithium ion secondary battery, an electric double layer capacitor, a solar cell, and a fuel cell.

Hereinafter, although a case in which the energy device is a lithium ion secondary battery will be described in detail, the energy device of the disclosure is not limited to the following contents.

A lithium ion secondary battery includes, for example, a positive electrode, a negative electrode, a separator interposed between the positive electrode and the negative electrode, and an electrolytic solution.

The energy device electrode of the disclosure is used as at least one of the positive electrode and the negative electrode. Since the energy device electrode of the disclosure contains the resin for an energy device electrode of the disclosure as a binder resin, the discharge capacity tends to be improved, and generation of a gas tends to be suppressed. Although the reason is not clear, it is assumed that the binder resin forms a film with favorable ion permeability to constituent components of a mixture layer such as an active material, a conductive agent, and the like, and the film suppresses decomposition of an electrolytic solution.

When an electrode other than the energy device electrode of the disclosure is used as one of a positive electrode and a negative electrode, one commonly used in this field can be used.

—Separator—

A separator is not particularly limited as long as the separator has ion permeability while electrically insulating between a positive electrode and a negative electrode, and has resistance to oxidation on the positive electrode side and reducibility on the negative electrode side. A resin, an inorganic substance, or the like is used as a material of the separator which satisfies such characteristics.

As the above-described resin, an olefin polymer, a fluorine polymer, a cellulose polymer, a polyimide, nylon, or the like is used. Specifically, it is preferable to choose from materials which are stable to an electrolytic solution and excellent in liquid retention, and it is preferable to use a porous sheet, non-woven fabric, or the like, which is made of polyolefin such as polyethylene or polypropylene.

As the inorganic substance, an oxide such as alumina or silicon dioxide, a nitride such as aluminum nitride or silicon nitride, a sulfate such as barium sulfate or calcium sulfate, glass, or the like is used. For example, as a separator, one in which the above-described inorganic substance in the form of fibers or particles is attached to a thin film-shaped substrate such as a nonwoven fabric, a woven fabric, or a microporous film can be used.

As the thin film-shaped substrate, one having a pore diameter of from 0.01 µm to 1 µm and a thickness of from 5 µm to 50 µm is suitably used. For example, as a separator, a composite porous layer made of the above-described inorganic material in the form of fibers or particles using a binder such as a resin can be used. Furthermore, this composite porous layer formed on the surface of a positive electrode or a negative electrode may be used as a separator. Alternatively, this composite porous layer may be formed on the surface of another separator to form a multilayer separator. For example, a composite porous layer in which alumina particles having a 90% particle diameter (D90) of less than 1 μm are bound with a fluorocarbon resin as a binder may be formed on the surface of a positive electrode.

—Electrolytic Solution—

An electrolytic solution contains a solute (supporting salt) and a non-aqueous solvent, and further contains various additives if necessary. The solute usually dissolves in the non-aqueous solvent. An electrolytic solution is, for example, impregnated in a separator.

As the solute, one commonly used in this field can be used, and examples thereof include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, a lithium lower aliphatic carboxylate, LiCl, LiBr, LiI, chloroborane lithium, a borate salt, and an imide salt. Examples of the borate salt include lithium bis(1,2-benzenediolate (2-)-O,O') borate, lithium bis(2,3-naphthalenediolate (2-)-O,O') borate, lithium bis(2,2'-biphenyldiolate (2-)-O,O') borate, and lithium bis(5-fluoro-2-olate-1-benzenesulfonic acid-O,O') borate. Examples of the imide salt include lithium bistrifluoromethane sulfonate imide (($CF_3SO_2)_2$ NLi), lithium trifluoromethanesulfonate nonafluorobutanesulfonate imide (($CF_3SO_2)(C_4F_9SO_2$)NLi), and lithium bispentafluoroethane sulfonate imide (($C_2F_5SO_2)_2$NLi). The solutes may be used singly, or in combination of two or more kinds thereof. The amount of solute dissolved in the non-aqueous solvent is preferably from 0.5 mol/L to 2 mol/L.

As the non-aqueous solvent, one commonly used in this field can be used, and examples thereof include a cyclic carbonate, a chain carbonate, and a cyclic carboxylic ester. Examples of the cyclic carbonate include propylene carbonate (PC) and ethylene carbonate (EC). Examples of the chain carbonate include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). Non-aqueous solvents may be used singly, or in combination of two or more kinds thereof.

The non-aqueous solvent preferably contains vinylene carbonate (VC) from the viewpoint of further improving the battery characteristics.

The content of vinylene carbonate (VC) when contained is preferably from 0.1% by mass to 2% by mass, and more preferably from 0.2% by mass to 1.5% by mass, with respect to the total amount of the non-aqueous solvent.

Hereinafter, an embodiment in which the disclosure is applied to a laminate type lithium ion secondary battery will be described.

The laminate type lithium ion secondary battery can be prepared, for example, as follows. First, a positive electrode and a negative electrode are cut into a rectangular shape, and a tab is welded to each of the electrodes to produce a positive electrode terminal and a negative electrode terminal. An electrode layered body prepared by layering with a separator interposed between the positive electrode and the negative electrode is housed in an aluminum laminate package as it is, the positive electrode terminal and the negative electrode terminal are extended out of the aluminum laminate package, and the laminate package is sealed. Next, an electrolytic solution is poured into the aluminum laminate package, and an opening of the aluminum laminate package is sealed. A lithium ion secondary battery is thereby obtained.

Next, with reference to the drawings, an embodiment in which the disclosure is applied to a 18650 type cylindrical lithium ion secondary battery will be described.

The FIGURE shows a sectional view of a lithium ion secondary battery to which the disclosure is applied.

As shown in the FIGURE, a lithium ion secondary battery 1 of the disclosure includes a bottomed cylindrical battery container 6 made of nickel-plated steel. An electrode group 5 in which a strip-like positive electrode plate 2 and a negative electrode plate 3 are wound in a spiral shape in cross section with a separator 4 interposed therebetween is housed in the battery container 6. The separator 4 is set to, for example, 58 mm in width and 30 μm in thickness. At an upper end face of the electrode group 5, a ribbon-shaped positive electrode tab terminal made of aluminum whose one end is fixed to the positive electrode plate 2 is led. The other end of the positive electrode tab terminal is joined by ultrasonic welding to the lower surface of a disk-shaped battery cover which is disposed on an upper side of the electrode group 5 and which is to be a positive electrode external terminal. On the other hand, on the lower end face of the electrode group 5, a ribbon-shaped negative electrode tab terminal made of copper, one end of which is fixed to the negative electrode plate 3, is led. The other end of the negative electrode tab terminal is joined by resistance welding to the inner bottom of the battery container 6. Therefore, the positive electrode tab terminal and the negative electrode tab terminal are respectively led to the opposite sides of both end surfaces of the electrode group 5. An insulating coating (not shown) is provided on the entire periphery of the outer peripheral surface of the electrode group 5. The battery cover is crimped to an upper portion of the battery container 6 via an insulating resin gasket. For this reason, the inside of the lithium ion secondary battery 1 is sealed. An electrolytic solution (not shown) is injected into the battery container 6.

EXAMPLES

Hereinafter, the invention will be specifically described by way of Examples, but the invention is not limited thereto.

Example 1A

A reaction solution was prepared by adding, in 1.0-liter separable flask equipped with a stirrer, a thermometer, and a condenser, 41.8 g of acrylonitrile corresponding to a nitrile group-containing monomer (Wako Pure Chemical Industries, Ltd.), 1.4 g of methoxytriethylene glycol acrylate corresponding to a monomer represented by Formula (I) (manufactured by Shin-Nakamura Chemical Co., Ltd., trade name: NK ester AM-30G) (ratio of 0.008 moles with respect to 1 mole of acrylonitrile), 767 mg of potassium persulfate corresponding to a polymerization initiator (manufactured by Wako Pure Chemical Industries, Ltd.), α-methylstyrene dimer corresponding to a chain transfer agent (manufactured by Wako Pure Chemical Industries, Ltd.), and 450 mL of purified water (manufactured by Wako Pure Chemical Industries, Ltd.) under nitrogen atmosphere. The reaction solution was vigorously stirred at 60° C. for 3 hours and then at 80° C. for 3 hours. After cooling to room temperature (25° C.), the reaction solution was suction filtered and a precipitated resin was separated by filtration. The filtered resin was washed successively with 300 mL of purified water (manufactured by Wako Pure Chemical Industries, Ltd.) and 300 mL of acetone (manufactured by Wako Pure Chemical Industries, Ltd.). The washed resin was dried by a vacuum dryer at 60° C./1 torr for 24 hours, and a resin for an energy device electrode was obtained.

Examples 2A to 5A

A resin for an energy device electrode was synthesized by the method shown in Example 1A except that the composition of the monomer and the polymerization initiator was changed to values shown in Table 1.

The compositions and yields of Examples 1A-5A are summarized in Table 1.

TABLE 1

| | Monomer composition (Amount used g) | | Polymerization initiator (g) | |
|---|---|---|---|---|
| | Acrylonitrile | Methoxy triethylene glycol acrylate | Potassium persulfate | Yield (%) |
| Example 1A | 41.8 | 1.4 | 0.77 | 98 |
| Example 2A | 40.4 | 2.8 | 0.77 | 98 |
| Example 3A | 39.0 | 4.2 | 0.77 | 97 |
| Example 4A | 37.6 | 5.6 | 0.77 | 96 |
| Example 5A | 36.2 | 7.0 | 0.77 | 96 |

Example 1B

In a 0.5-liter separable flask equipped with a stirrer, a thermometer, and a condenser, under nitrogen atmosphere, 400 mL of purified water (manufactured by Wako Pure Chemical Industries, Ltd.) was added, and 347 mg of ammonium persulfate corresponding to a polymerization initiator (manufactured by Wako Pure Chemical Industries, Ltd.) was added while stirring at 73° C. After confirming that the ammonium persulfate had dissolved, a mixed solution of 41.8 g of acrylonitrile corresponding to a nitrile group-containing monomer (manufactured by Wako Pure Chemical Industries, Ltd.) and 1.4 g of methoxytriethylene glycol acrylate corresponding to a monomer represented by Formula (I) (manufactured by Shin-Nakamura Chemical Co., Ltd., trade name: NK ester AM-30G) (ratio of 0.008 moles with respect to 1 mole of acrylonitrile) was dropped over 2 hours. After stirring for 1 hour, 420 mg of ammonium persulfate was added, and the mixture was further stirred for 1 hour. Next, the reaction solution was heated to 90° C., 210 mg of ammonium persulfate was added, and the mixture was further stirred for 1 hour. Then, after cooling to room temperature (25° C.), the reaction solution was suction filtered, and a precipitated resin was separated by filtration. The filtered resin was washed with 300 mL of purified water (manufactured by Wako Pure Chemical Industries, Ltd.). The washed resin was dried by a dryer at 100° C. for 12 hours, and a resin for an energy device electrode was obtained.

Examples 2B to 9B

A resin for an energy device electrode was synthesized by the method shown in Example 1B except that the composition of the monomer and the polymerization initiator was changed to values shown in Table 2. In Table 2, AM-90G means NK ester AM-90G (methoxypoly (n=9) ethylene glycol acrylate) manufactured by Shin-Nakamura Chemical Co., Ltd., and 2-MTA means 2-methoxyethyl acrylate.

The compositions and yields of Examples 2B-9B are summarized in Table 2.

TABLE 2

| | Monomer composition (g) | | | | Polymerization initiator (g) | |
|---|---|---|---|---|---|---|
| | Acrylonitrile | AM-30G | 2-MTA | AM-90G | Potassium persulfate | Yield (%) |
| Example 1B | 41.8 | 1.4 | — | — | 0.977 | 98 |
| Example 2B | 40.4 | 2.8 | — | — | 0.977 | 98 |
| Example 3B | 39.0 | 4.2 | — | — | 0.977 | 97 |
| Example 4B | 37.6 | 5.6 | — | — | 0.977 | 96 |
| Example 5B | 36.2 | 7.0 | — | — | 0.977 | 96 |
| Example 6B | 40.4 | — | 2.8 | — | 0.977 | 97 |
| Example 7B | 40.4 | — | — | 2.8 | 0.977 | 97 |
| Example 8B | 41.8 | — | — | 1.4 | 0.977 | 97 |
| Example 9B | 39.0 | — | — | 4.2 | 0.977 | 97 |

(1) Swelling Resistance to Electrolytic Solution

Resins for an energy device electrode obtained in Examples 1A to 5A and Examples 1B to 9B and polyvinylidene fluoride (Comparative Example 1) and N-methyl-2-pyrrolidone (hereinafter, referred to as NMP) were mixed, and varnishes containing 10% by mass of a resin for an energy device electrode based on the whole were prepared. Each varnish was applied onto a glass substrate in such a manner that the film thickness after drying was about 10 μm, dried for 2 hours with a fan-type drier at 120° C., and then dried for 10 hours with a vacuum dryer (120° C./1 torr), and a resin film was prepared. The obtained resin film was cut into 2 cm squares in a glove box under an argon atmosphere, and the mass was measured. Thereafter, the cut resin film and a sufficient amount of an electrolytic solution (ethylene carbonate/diethyl carbonate/dimethyl carbonate=1/1/1 mixed solution (volume ratio) containing 1 M $LiPF_6$) for immersing the resin film were added to a sealable container, and the container was sealed. The sealed container containing the resin film and the electrolytic solution was placed in a thermostat chamber at 25° C. and 50° C. and left for 24 hours. The sealed container was put again in a glove box under an argon atmosphere, the resin film was taken out, the electrolytic solution attached to the surface was wiped off with a filter paper, and then the mass after immersion was measured. The swelling degree was calculated from the following formula, and the results are summarized in Table 3 and Table 4. The lower the swelling degree, the more excellent the swelling resistance.

swelling degree (%)=[(mass after immersion (g)–mass before immersion (g))/(mass before immersion)]×100

(2) Adhesion to Current Collector

Example 6A

After mixing lithium manganate, which is a positive electrode active material, acetylene black (trade name: HS-100, average particle diameter 48 nm (Denka Co., Ltd.

catalog value), manufactured by Denka Co., Ltd.) as a conductive particle, and the resin for an energy device electrode obtained in Example 1A in such a manner that the mass ratio (the total mass ratio was 100% by mass) of the solid content was from 90.5% by mass to 94.5% by mass (positive electrode active material): 4.5% by mass (conductive particle): from 5.0% by mass to 1.0% by mass (resin for energy device electrode), NMP was further added, the viscosity was adjusted, and a positive electrode mixture slurry was prepared. This slurry was applied substantially uniformly and homogenously on one side of a 20-μm-thick aluminum foil as a current collector for a positive electrode in such a manner that the coated amount after drying was 150.0 g/m². Drying treatment was then performed, and a sheet-like electrode was prepared. The obtained electrode was pressed by a roll press, and an electrode having a density of the mixture layer of 2.7 g/cm³ was prepared. At this time, the presence or absence of peeling of the mixture layer was visually confirmed, and the relationship with the resin content (% by mass) was examined. The adhesive strength is considered to be higher as peeling of the mixture layer does not occur with less resin content. The results are shown in Table 3.

that the coated amount after drying was 150.0 g/m². Drying treatment was then performed, and a sheet-like electrode was prepared. The obtained electrode was cut into strips 500 mm long and 53 mm wide, and then pressed using a press roll at room temperature (25° C.), and the electrode density was measured. The roll gap in the press roll was 10 μm, and the press load was 70 kN. Based on the obtained result, it was determined that the higher the electrode density after pressing, the more excellent the rollability. The results are shown in Table 3. The electrode density was calculated from the thickness of the mixture layer and the application amount of the mixture layer.

Examples 7A to 10A and Comparative Example 2

Electrodes were prepared and evaluated in the same manner as in Example 6A except that the resins for an energy device electrode obtained in Examples 2A to 5A and polyvinylidene fluoride (Comparative Example 1) were used.

TABLE 3

| Item | Resin | Swelling degree (%) 25° C. | Swelling degree (%) 50° C. | Presence or Absence of Peeling for resin component (% by mass) 1.0 | 1.5 | 2.0 | 2.5 | 3.0 | 4.0 | 5.0 | Rollability (g/cm³) |
|---|---|---|---|---|---|---|---|---|---|---|---|
| Example 6A | Example 1A | 1 | 2 | Absence | Absence | Absence | Absence | Absence | Absence | Absence | 2.7 |
| Example 7A | Example 2A | 1 | 2 | Absence | Absence | Absence | Absence | Absence | Absence | Absence | 2.9 |
| Example 8A | Example 3A | 1 | 2 | Absence | Absence | Absence | Absence | Absence | Absence | Absence | 2.9 |
| Example 9A | Example 4A | 2 | 3 | Absence | Absence | Absence | Absence | Absence | Absence | Absence | 3.0 |
| Example 10A | Example 5A | 2 | 3 | Absence | Absence | Absence | Absence | Absence | Absence | Absence | 3.1 |
| Comparative Example 2 | Comparative Example 1 | 6 | 8 | Presence | Presence | Presence | Presence | Absence | Absence | Absence | 3.1 |

(3) Rollability

After mixing lithium manganate, which is a positive electrode active material, acetylene black (trade name: HS-100, average particle diameter 48 nm (Denka Co., Ltd. catalog value), manufactured by Denka Co., Ltd.) as a conductive particle, and the resin for an energy device electrode obtained in Example 1A in such a manner that the mass ratio (the total mass ratio was 100% by mass) of the solid content was 94.0% by mass:4.5% by mass:1.5% by mass, NMP was further added, the viscosity was adjusted, and a positive electrode mixture slurry was prepared. This slurry was applied substantially uniformly and homogenously on one side of a 20-μm-thick aluminum foil as a current collector for a positive electrode in such a manner Examples 10B to 18B Electrodes were prepared and evaluated in the same manner as in Example 6A except that the resins for an energy device electrode obtained in Examples 1B to 9B were used.

TABLE 4

| Item | Resin | Swelling degree (%) 25° C. | Swelling degree (%) 50° C. | Presence or Absence of Peeling for resin component (% by mass) 1.0 | 1.5 | 2.0 | 2.5 | 3.0 | 4.0 | 5.0 | Rollability (g/cm³) |
|---|---|---|---|---|---|---|---|---|---|---|---|
| Example 10B | Example 1B | 1 | 2 | Absence | Absence | Absence | Absence | Absence | Absence | Absence | 2.7 |
| Example 11B | Example 2B | 1 | 2 | Absence | Absence | Absence | Absence | Absence | Absence | Absence | 2.9 |
| Example 12B | Example 3B | 1 | 2 | Absence | Absence | Absence | Absence | Absence | Absence | Absence | 2.9 |
| Example 13B | Example 4B | 2 | 3 | Absence | Absence | Absence | Absence | Absence | Absence | Absence | 3.0 |
| Example 14B | Example 5B | 2 | 3 | Absence | Absence | Absence | Absence | Absence | Absence | Absence | 3.1 |
| Example 15B | Example 6B | 1 | 3 | Absence | Absence | Absence | Absence | Absence | Absence | Absence | 2.7 |
| Example 16B | Example 7B | 2 | 4 | Absence | Absence | Absence | Absence | Absence | Absence | Absence | 3.0 |
| Example 17B | Example 8B | 2 | 3 | Absence | Absence | Absence | Absence | Absence | Absence | Absence | 2.9 |
| Example 18B | Example 9B | 3 | 4 | Absence | Absence | Absence | Absence | Absence | Absence | Absence | 3.1 |

From the results of Tables 3 and 4, the resins for an energy device electrode obtained in Examples 1A to 5B and Examples 1B to 9B are superior in adhesion to polyvinylidene fluoride. It can be seen that the same or slightly inferior rollability as compared to polyvinylidene fluoride is exhibited. When the rollability is about 2.7 g/cm³, there is no problem in practical use. It was suggested that a resin for an energy device electrode had high rollability, as the amount of methoxytriethylene glycol acrylate used was increased.

This was considered to be because the pliability of a resin for an energy device electrode was improved by using methoxytriethylene glycol acrylate. On the other hand, the swelling degree tended to increase as the amount of methoxytriethylene glycol acrylate used was increased. It was considered that this was because methoxytriethylene glycol acrylate had high affinity to an electrolytic solution. The tendency to increase the swelling degree was also observed in Examples 16B to 18B using methoxy poly (n=9) ethylene glycol acrylate. In other words, the amount of methoxy poly (n=9) ethylene glycol acrylate used increased in the order of Examples 8B, 7B, and 9B, and the swelling degree increased in the order of Examples 17B, 16B, and 18B. In any of Examples, when the content of the binder resin was 1.0% by mass or more, there was no peeling, and it was suggested that there was an advantage over Comparative Examples.

<Evaluation of Battery Property>
(1) Preparation of Positive Electrode

Example 11A

After mixing lithium manganate, which is a positive electrode active material, acetylene black (trade name: HS-100, average particle diameter 48 nm (Denka Co., Ltd. catalog value), manufactured by Denka Co., Ltd.) as a conductive particle, and the resin for an energy device electrode obtained in Example 1A in such a manner that the mass ratio (the total mass ratio was 100% by mass) of the solid content was 94.0% by mass:4.5% by mass:1.5% by mass, NMP was further added, the viscosity was adjusted, and a positive electrode mixture slurry was prepared. This slurry was applied substantially uniformly and homogenously on one side of a 20-μm-thick aluminum foil as a current collector for a positive electrode in such a manner that the coated amount after drying was 150.0 g/m². Drying treatment was then performed, and a sheet-like electrode was prepared. The obtained electrode was pressed by a roll press in such a manner that the density of the mixture layer was 2.7 g/cm³, and then cut into a 10.0 cm×7.5 cm rectangle. Then, in order to remove residual solvent and adsorbed water in the electrode, vacuum drying was performed at 120° C. for 16 hours, and a positive electrode for evaluating the battery characteristics was obtained.

Examples 12A to 15A and Examples 19B to 27B

A positive electrode was obtained in the same manner as in Example 11A except that the resins for an energy device electrode obtained in Examples 2A to 5A and Examples 1B to 9B were used.

<Preparation of Battery for Evaluating Positive Electrode>

Example 16A

Metallic lithium was polished on the surface until glossiness was obtained, and the metallic lithium was crimped substantially uniformly and homogeneously to a copper mesh as a negative electrode current collector, and a rectangular negative electrode of 10.2 cm×7.7 cm was obtained. Subsequently, after making the positive electrode and negative electrode which were prepared in Example 11A oppose via a 12.0 cm×10.0 cm rectangular separator, a tab wire for current collection was connected to each of the positive electrode and negative electrode, and an electrode group was obtained. The obtained electrode group was placed in a laminate, and after injecting 1,000 μL of an electrolytic solution, vacuum sealing was performed, and a laminate type battery was obtained. As the electrolytic solution, one obtained by adding 1.0% by mass of vinylene carbonate to ethylene carbonate/diethyl carbonate/dimethyl carbonate=1/1/1 mixed solution (volume ratio) containing 1.0 M $LiPF_6$ with respect to the total amount of the mixed solution was used. A porous sheet of polyethylene was used for the separator.

Examples 17A to 20A and Examples 28B to 36B

A battery for evaluating a positive electrode was prepared in the same manner as in Example 16A except that the positive electrodes produced in Examples 12A to 15A and Examples 19B to 27B were used.

<Measurement of Capacity>

Batteries prepared by the methods of Examples 16A to 20A and Examples 28B to 36B were placed in a thermostat chamber set at 25° C., and charged and discharged under the following conditions under an environment of 25° C. using a charge/discharge device (trade name: TOSCAT-3200, manufactured by TOYO SYSTEM Co., LTD.). After performing constant current constant voltage (CCCV) charging (charge termination condition: 0.01 C) at 4.2 V, 0.1 C, constant current (CC) discharging was performed at from 0.1 C to 2.7 V. This operation was regarded as one cycle, charging and discharging were repeated four times (four cycles) under the same conditions, and the discharge capacity at the end of the fourth cycle was measured as the battery capacity.

<Evaluation of Cycle Characteristics>

The discharge capacity after 50 cycles was measured under the same conditions as the capacity measurement except that the temperature of the thermostat chamber was changed to 50° C. This value was expressed as a percentage of the discharge capacity at the 4th cycle, and the cycle characteristics were evaluated. The larger the value, the more excellent the cycle characteristics.

<Evaluation of Input/Output Charcteristics>

After four cycles of charging and discharging were performed under the same conditions as the capacity measurement, the discharge capacity at 1 C was measured. This value was expressed as a percentage of the discharge capacity at the fourth cycle, and the input/output characteristics were evaluated. The larger the value, the more excellent the input/output characteristics.

The evaluation results are summarized in Tables 5 and 6.

TABLE 5

| | Resin | Capacity mAh | Cycle characteristics 50° C. (%) | Input/output characteristics 50° C. (%) |
|---|---|---|---|---|
| Example 16A | Example 1A | 103 | 90 | 99 |
| Example 17A | Example 2A | 101 | 90 | 99 |
| Example 18A | Example 3A | 100 | 88 | 99 |
| Example 19A | Example 4A | 101 | 87 | 99 |
| Example 20A | Example 5A | 101 | 86 | 99 |

TABLE 6

|  | Resin | Capacity mAh | Cycle characteristics 50° C. (%) | Input/output characteristics 50° C. (%) |
|---|---|---|---|---|
| Example 28B | Example 1B | 103 | 90 | 99 |
| Example 29B | Example 2B | 101 | 90 | 99 |
| Example 30B | Example 3B | 100 | 88 | 99 |
| Example 31B | Example 4B | 101 | 87 | 99 |
| Example 32B | Example 5B | 101 | 86 | 99 |
| Example 33B | Example 6B | 101 | 90 | 99 |
| Example 34B | Example 7B | 101 | 90 | 99 |
| Example 35B | Example 8B | 103 | 90 | 99 |
| Example 36B | Example 9B | 100 | 88 | 99 |

From the results of Tables 5 and 6, Examples 16A to 20A and Examples 28B to 36B using resins for an energy device electrode obtained in Examples 1A to 5A and Examples 1B to 9B as a binder resin are excellent in cycle characteristics. The reason is presumed as follows.

Since a binder resin adheres to the surface of an active material and exhibits adhesion, polyvinylidene fluoride generally used as a binder resin for a positive electrode is considered to adhere at a point (point bond) to the surface of the active material or the like. Therefore, when polyvinylidene fluoride is used, an active material tends to be exposed, and the contact area between the active material and an electrolytic solution tends to increase. As a result, generation of gas due to decomposition of the electrolytic solution and the like are induced on the surface of the active material, which is considered to cause deterioration of cycle characteristics.

On the other hand, it is considered that the resins for an energy device electrode obtained in Examples 1A to 5A and Examples 1B to 9B cover and bond the entire surface (surface bonding) of the active material, and since the active material can be prevented from being exposed, generation of gas and the like due to decomposition of the electrolytic solution can be suppressed on the surface of the active material, and high cycle characteristics can be maintained.

Example 21A (Preparation of Positive Electrode Active Material)

After suspending 1,390 g of lithium carbonate in pure water, a metal salt solution was added at 1.6 L/hour. The metal salt solution was prepared using hydrates of nitrates of nickel, manganese, and cobalt. The ratio of nickel, cobalt, and aluminum contained in the metal salt solution was adjusted to a composition ratio of Ni:Mn:Co=80% by mole: 10% by mole: 10% by mole in such a manner that the compound obtained as the positive electrode active material was $LiNi_{0.8}Mn_{0.1}Co_{0.1}O_2$.

By this treatment, fine particle lithium-containing carbonate was precipitated in the solution. The precipitate was washed twice with saturated lithium carbonate solution and filtered off using a filter press. Subsequently, the precipitate was dried, and a lithium-containing carbonate which is a precursor of a positive electrode active material was obtained.

Next, the obtained lithium-containing carbonate was placed in a calcining furnace, heated to 850° C. for 6 hours, and heated and held for 2 hours, then cooled, and an oxide is obtained. The obtained oxide was crushed, and a positive electrode active material was obtained. Hereinafter, the positive electrode active material is referred to as NMC (811).

(Preparation of Positive Electrode)

After mixing NMC(811), which is a positive electrode active material, acetylene black (trade name: HS-100, average particle diameter 48 nm (Denka Co., Ltd. catalog value), manufactured by Denka Co., Ltd.) as a conductive particle, and the resin for an energy device electrode obtained in Example 1A in such a manner that the mass ratio (the total mass ratio was 100% by mass) of the solid content was 94.0% by mass:4.5% by mass:1.5% by mass, NMP was further added, the viscosity was adjusted, and a positive electrode mixture slurry was prepared. This slurry was applied substantially uniformly and homogenously on one side of a 20-μm-thick aluminum foil as a current collector for a positive electrode in such a manner that the coated amount after drying was 150.0 g/m². Drying treatment was then performed, and a sheet-like electrode was prepared. The obtained electrode was pressed by a roll press in such a manner that the density of the mixture layer was 2.7 g/cm³, and then cut into a 9.0 cm×6.5 cm rectangle. Then, in order to remove residual solvent and adsorbed water in the electrode, vacuum drying was performed at 120° C. for 16 hours, and a positive electrode for evaluating the battery characteristics was obtained.

(Preparation of Battery for Evaluating Positive Electrode)

Metallic lithium was polished on the surface until glossiness was obtained, and the metallic lithium was crimped substantially uniformly and homogeneously to a copper mesh as a negative electrode current collector, and a rectangular negative electrode of 9.2 cm×6.7 cm was obtained. Subsequently, after making the positive electrode and the negative electrode which were prepared as above oppose via a 12.0 cm×10.0 cm rectangular separator, a tab wire for current collection was connected to each of the positive electrode and the negative electrode, and an electrode group was obtained. The obtained electrode group was placed in a laminate, and after injecting 1,000 μL of an electrolytic solution, vacuum sealing was performed, and a laminate type battery was obtained. As the electrolytic solution, one obtained by adding 1.0% by mass of vinylene carbonate to ethylene carbonate/diethyl carbonate/dimethyl carbonate=1/1/1 mixed solution (volume ratio) containing 1.0 M $LiPF_6$ with respect to the total amount of the mixed solution was used. A porous sheet of polyethylene was used for the separator.

Examples 22A to 25A and Examples 37B to 45B

A positive electrode and a laminate type battery were prepared and evaluated in the same manner as in Example 21A except that the resins for an energy device electrode obtained in Examples 2A to 5A and Examples 1B to 9B were used. The evaluation results are shown in Tables 7 and 8.

TABLE 7

|  | Resin | Capacity mAh | Input/output characteristics 50° C. (%) |
|---|---|---|---|
| Example 21A | Example 1A | 154 | 99 |
| Example 22A | Example 2A | 151 | 99 |
| Example 23A | Example 3A | 150 | 99 |
| Example 24A | Example 4A | 151 | 99 |
| Example 25A | Example 5A | 151 | 99 |

TABLE 8

| | Resin | Capacity mAh | Input/output characteristics 50° C. (%) |
|---|---|---|---|
| Example 37B | Example 1B | 154 | 99 |
| Example 38B | Example 2B | 151 | 99 |
| Example 39B | Example 3B | 150 | 99 |
| Example 40B | Example 4B | 151 | 99 |
| Example 41B | Example 5B | 151 | 99 |
| Example 42B | Example 6B | 151 | 99 |
| Example 43B | Example 7B | 151 | 99 |
| Example 44B | Example 8B | 154 | 99 |
| Example 45B | Example 9B | 150 | 99 |

From the results of Table 7 and Table 8, the battery capacity is improved by using NMC (811) instead of lithium manganate as the positive electrode active material. These phenomena are considered to be based on the large capacity of NMC (811) used as the positive electrode active material.

The disclosure of International Application No. PCT/JP2017/007557 filed on Feb. 27, 2017, is hereby incorporated by reference in its entirety.

All the documents, patent applications and technical standards that are described in the present specification are hereby incorporated by reference to the same extent as if each individual document, patent application or technical standard is concretely and individually described to be incorporated by reference.

The invention claimed is:

1. A resin for an energy device electrode, the resin comprising:
   a structural unit derived from a nitrile group-containing monomer; and
   a structural unit derived from 2-methoxyethyl acrylate,
   wherein the resin does not comprise a structural unit that is derived from a carboxy group-containing monomer and that comprises a carboxy group, or the resin has a ratio of a structural unit that is derived from a carboxy group-containing monomer and that comprises a carboxy group of 0.01 moles or less with respect to 1 mole of the structural unit derived from a nitrile group-containing monomer,
   and a ratio of the structural unit derived from a nitrile group-containing monomer to a total of structural units derived from each monomer is from 90% by mole to less than 100%

(I)

2. The resin for an energy device electrode according to claim 1, wherein a ratio of the structural unit derived from 2-methoxyethyl acrylate with respect to 1 mole of the structural unit derived from a nitrile group-containing monomer is from 0.001 moles to 0.2 moles.

3. The resin for an energy device electrode according to claim 1, further comprising a structural unit derived from a monomer represented by the following Formula (II):

wherein, in Formula (II), $R_3$ represents a hydrogen atom or a methyl group, and $R_4$ represents an alkyl group having from 4 to 100 carbon atoms.

4. The resin for an energy device electrode according to claim 3, wherein a ratio of the structural unit derived from a monomer represented by Formula (II) with respect to 1 mole of the structural unit derived from a nitrile group-containing monomer is from 0.001 moles to 0.2 moles.

5. The resin for an energy device electrode according to claim 1, wherein the nitrile group-containing monomer comprises acrylonitrile.

6. A composition for forming an energy device electrode, the composition comprising the resin for an energy device electrode according to claim 1.

7. The composition for forming an energy device electrode according to claim 6, further comprising a positive electrode active material comprising a lithium-containing metal composite oxide comprising lithium and nickel and having a ratio of nickel to metal, excluding lithium, of 50% by mole or more.

8. The composition for forming an energy device electrode according to claim 7, wherein the positive electrode active material comprises a compound represented by the following Formula (III):

wherein, in Formula (III), M is at least one selected from the group consisting of Al, Mn, Mg and Ca, a, b, c, d, and e satisfy $0.2 \leq a \leq 1.2$, $0.5 \leq b \leq 0.9$, $0.05 \leq c \leq 0.4$, $0 \leq d \leq 0.2$, and $-0.2 \leq e \leq 0.2$, respectively, and $b+c+d=1$.

9. An energy device electrode, comprising:
   a current collector; and
   an electrode mixture layer provided on at least one surface of the current collector and comprising the composition for forming an energy device electrode according to claim 6.

10. An energy device comprising the energy device electrode according to claim 9.

11. The energy device according to claim 10, which is a lithium ion secondary battery.

* * * * *